Sept. 5, 1933.  K. M. SIMPSON  1,925,941
FURNACE
Filed June 29, 1931   3 Sheets-Sheet 3
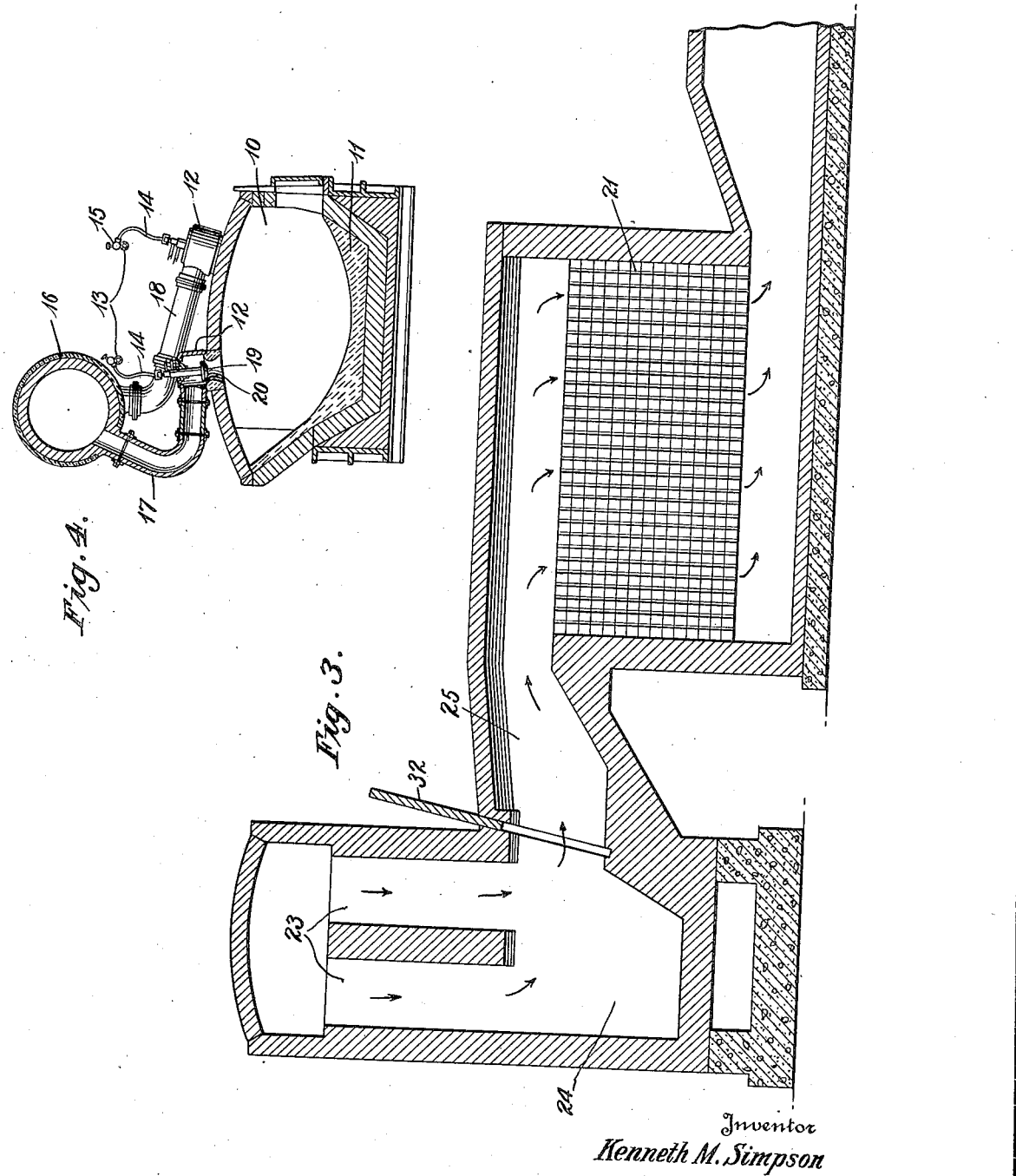

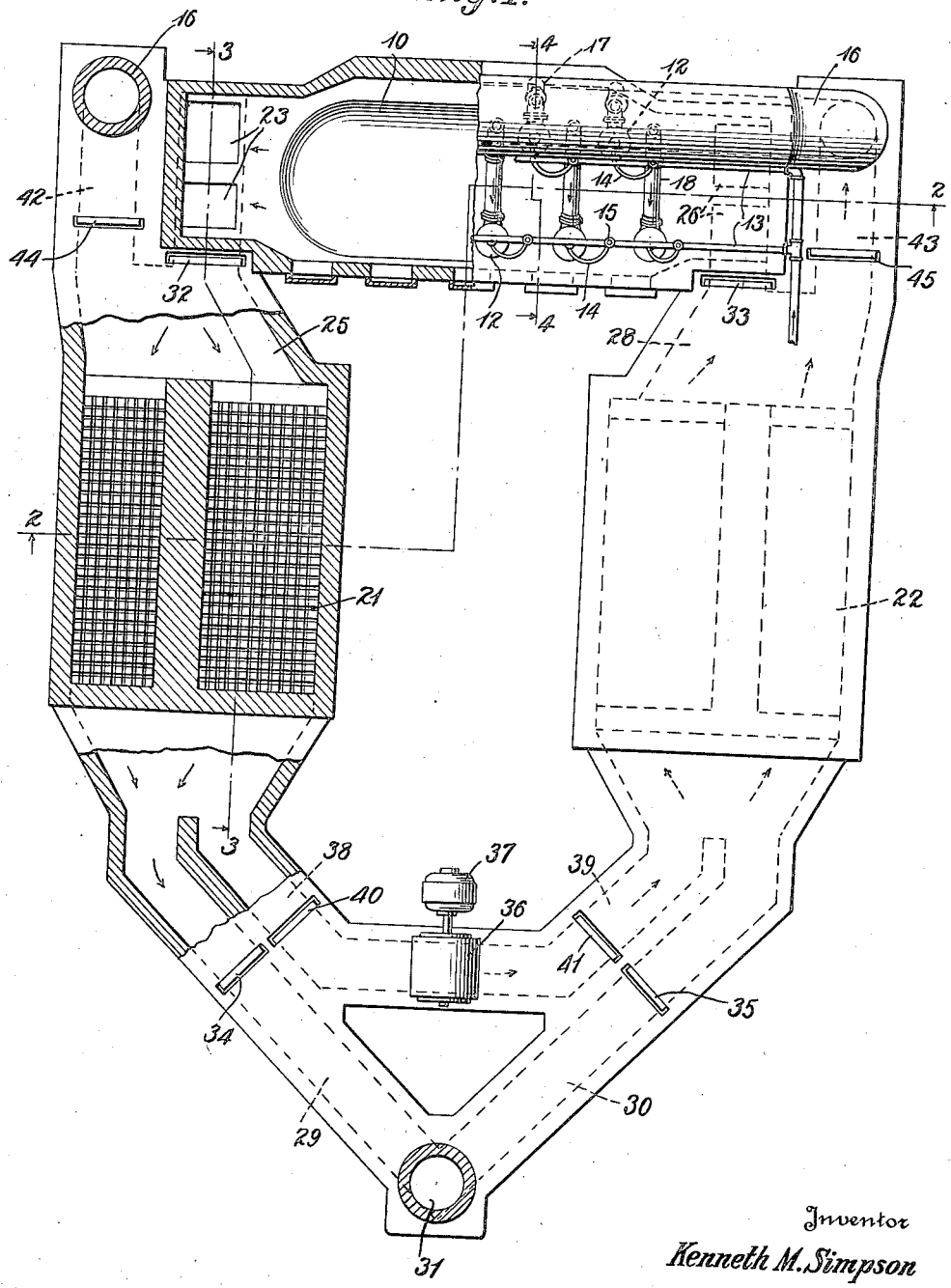

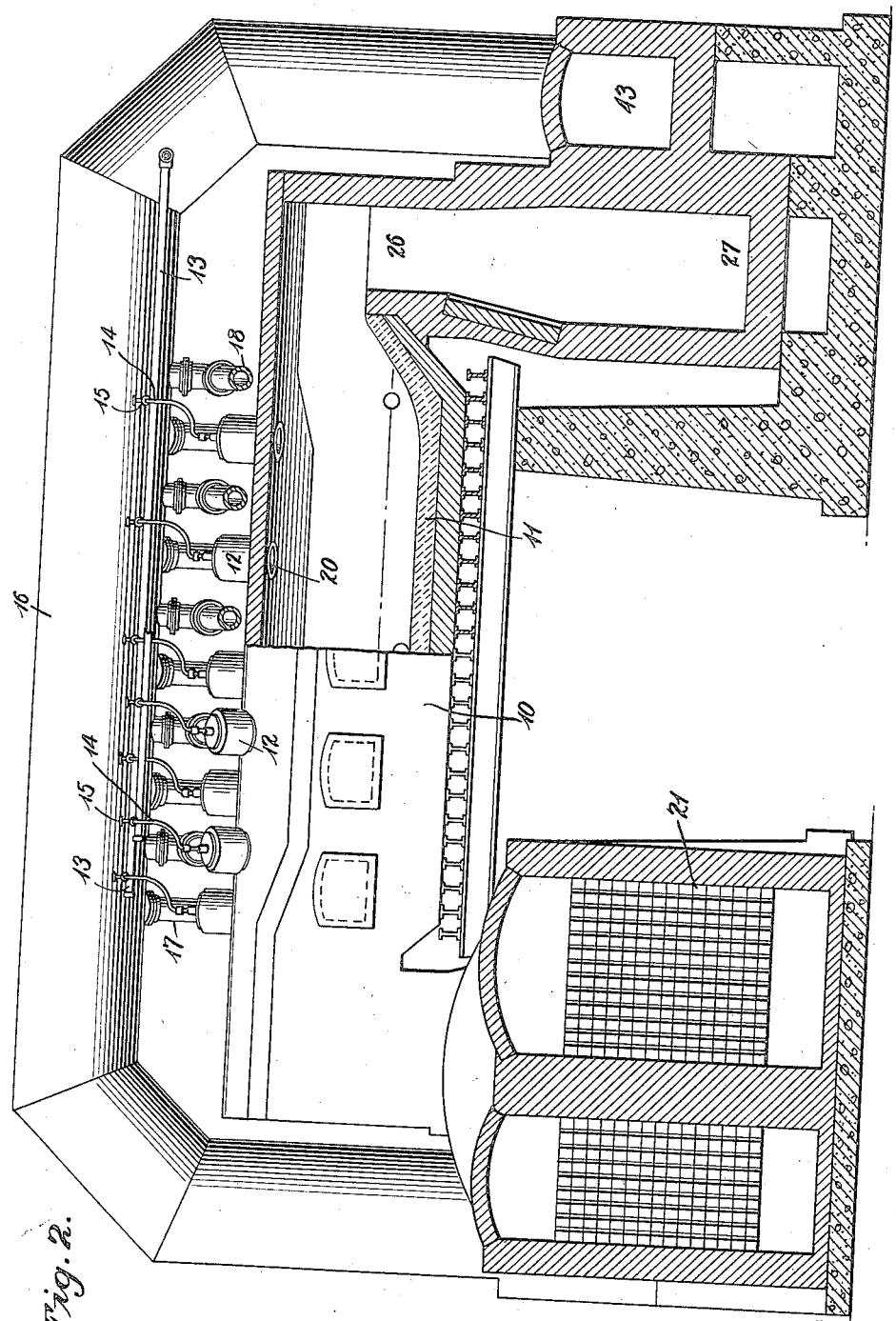

Patented Sept. 5, 1933

1,925,941

UNITED STATES PATENT OFFICE 1,925,941

FURNACE

Kenneth M. Simpson, New York, N. Y., assignor to International Chromium Process Corporation, New York, N. Y., a corporation of Delaware Application June 29, 1931. Serial No. 547,774

2 Claims. (Cl. 263—15)

My invention relates to furnaces and more particularly has reference to an improved furnace and regenerator combination. In my prior application, Serial No. 517,945, filed February 24, 1931, of which the present application is a continuation in part, I have disclosed and claimed a heating process according to which the material under treatment is efficiently and rapidly heated to the desired temperature by the impingement thereon of short intense flame moving under considerable velocity. In the preferred operation of the process referred to the material to be heated, such as a charge for a metallurgical furnace, is placed upon the hearth of a furnace and intense flame, generated adjacent the roof of the furnace, is forcibly projected upon the charge over substantially the entire area thereof. With a hearth of substantial size, a plurality of flames is directed downwardly onto the major portion of the surface of the charge from burners disposed at spaced points in the roof of the furnace. In a furnace of this type, I preferably employ a common air manifold to supply air to a number of the burners.

It is an object of the present invention to provide a furnace and regenerator combination which is especially suited for use in the performance of the process of my prior application above referred to.

A further object of my invention resides in the provision of a regenerator in combination with a furnace having a plurality of burners which are supplied with air from a common air manifold.

A more specific object of my invention is to provide, in combination with an open hearth furnace and a regenerator, separate and independently controlled means for discharging waste combustion gases from the furnace to the regenerator and for supplying preheated air from the regenerator to the furnace.

Other objects and advantages of my invention will appear from the more detailed description thereof.

In customary furnace-regenerator practice, the same ports which exhaust waste combustion products from the furnace to the regenerator during one-half of the operating cycle, are used to introduce the preheated air necessary for combustion to the furnace from the regenerator. As distinguished from this customary practice, in accordance with my invention, I provide an air conduit or flue leading from the regenerator to the furnace and a separate conduit or flue leading from the furnace to the regenerator, each of these conduits or flues being provided with an independently operable valve. It will be seen that this arrangement is of special advantage and utility where a common air manifold is employed to supply preheated air from the regenerator to a plurality of burners.

For a fuller understanding of my invention, reference will be had to the accompanying drawings illustrating a preferred embodiment of my improved furnace and regenerator combination. The showing of the drawings is for illustrative purposes only and is not to be construed as limiting the invention as the latter may take other forms than the one herein illustrated and described.

In the drawings:

Figure 1 is a plan view and partial section of a top fired open hearth furnace equipped with a pair of regenerators and embodying the principles of my invention;

Figure 2 is a partial section taken on the line 2—2 of Figure 1;

Figure 3 is a sectional view on the line 3—3 of Figure 1; and

Figure 4 is a transverse sectional view of the furnace taken on the line 4—4 of Figure 1.

Referring more particularly to the drawings, I have indicated generally at 10 a top fired open hearth furnace similar to that disclosed in my prior application above referred to. The hearth 11 of the furnace is adapted to retain the charge to be heated which is impinged upon by intense flame over the major portion of the surface thereof in accordance with the process described and claimed in my prior application. The flames are generated directly above the charge on the hearth by means of burners 12 disposed at spaced points in the roof of the furnace as best shown in Figures 2 and 4. The burners are supplied with fuel from oil manifolds 13 and independent connections 14 leading from the manifolds to each burner as shown. Each connection 14 is provided with an independent valve 15 so that the burners may be independently controlled and regulated. Preheated air is supplied to all the burners from a common air manifold 16, connections 17 leading from the manifold to the burners on one side of the furnace and connections 18 leading from the manifold to the burners on the opposite side of the furnace. Any suitable means may be provided for independently varying or regulating the amount of air supplied from manifold 16 to each burner. For example, this regulation may be effected by varying the distance between burner tip 19 and burner opening 20 of the roof of the furnace (Fig. 4).

At opposite sides of the furnace, I have shown conventional regenerators 21 and 22 provided with the customary checker brick. A pair of down comers 23 for waste combustion gases establishes communication between one end of the furnace and regenerator chamber 21 through slag pocket 24 and neck 25, the combustion gases passing downwardly through the checker brick as best shown in Figure 3. A similar pair of down comers 26 is provided at the opposite end of the furnace for discharging waste combustion gases from the furnace downwardly into slag pocket 27 and then through neck 28 into regenerator chamber 22. Flues 29 and 30 establish communication between stack 31 and regenerators 21 and 22, respectively. A valve 32 is provided between slag pocket 24 and neck 25 of the regenerator 21 to open and close communication between one end of the furnace and regenerator 21. A valve 33 is similarly provided for down comers 26 to establish and discontinue communication between the opposite end of the furnace and regenerator 22. Exhaust flues 29 and 30 are also provided with valves 34 and 35, respectively. Valves 32 and 34 are adapted to be open while valves 33 and 35 are closed and vice versa.

Air to be heated is supplied from fan or blower 36, driven by motor 37, to regenerator 21 through conduit 38 and to regenerator 22 through conduit 39. The conduits or air intakes are provided with valves 40 and 41, respectively. The neck 25 of regenerator chamber 21 communicates with air manifold 16 through conduit 42 while neck 28 of regenerator chamber 22 communicates with the other end of manifold 16 through conduit 43. The air conduits 42 and 43 are provided respectively with valves 44 and 45 to open and close communication between the regenerator chambers and the air manifold 16. Valves 40 and 44 are adapted to be closed while valves 41 and 45 are open and vice versa. Also valves 40 and 44 are intended to remain closed while valves 32 and 34 are open and valves 41 and 45 are intended to be open while valves 33 and 35 are closed. These valves may be operated in any suitable manner and they are positioned so that one regenerator is being heated by waste combustion products from the furnace while the other regenerator is operated to preheat air being supplied to manifold 16.

In operation, assuming that regenerator 21 is being heated by waste combustion gases from the furnace and that regenerator 22 is giving up its heat to the air for combustion, valves 32, 34, 41 and 45 will be open and valves 40, 44, 33 and 35 will be closed. The waste combustion products from the furnace will hence pass downwardly through down comers 23, through slag pocket 24, open valve 32, neck 25, downwardly through the checker brick in regenerator 21 thus heating the same, thence into flue 29 and through open valve 34 to stack 31. In the meantime, air is being passed from fan or blower 36 through open valve 41 in conduit 39, then upwardly through the hot checker brick in regenerator 22 thereby being preheated, then through neck 28 and open valve 45 in conduit 43 to the air manifold 16. From the manifold the preheated air is distributed to the various burners in the furnace through the connections 17 and 18.

After the checker brick in regenerator 22 has been cooled by the passage of air therethrough, the position of the valves is shifted and the flow of combustion gases and air reversed. That is to say, valves 32, 34, 41 and 45 will now be closed and valves 33, 35, 40 and 44 opened. In this phase of the operating cycle, the combustion gases from the furnace will discharge through down comers 26, slag pocket 27 and open valve 33, passing downwardly through the checker brick in regenerator 22 and then through open valve 35 in conduit 30 to stack 31. During this interval air is supplied from blower 36 through open valve 40 in conduit 38, passing then upwardly through the heated checker brick in regenerator 21, through neck 25 and open valve 44 in conduit 42 to air manifold 16, for distribution to the burners through connections 17 and 18. This shifting of valves and reversal of flow are repeated throughout the operation of the furnace. It has been found in practice that satisfactory operating conditions are achieved with an interval of about fifteen minutes between reversals.

What I claim is:

1. In combination with a furnace having a hearth and a roof disposed above the hearth, burners mounted adjacent the furnace roof in spaced relationship over a substantial area and adapted to project flame downwardly toward the hearth, an air manifold outside the furnace, connections for supplying air from the manifold to a plurality of the burners, a first regenerator and a valved conduit connecting the same with one end of said manifold, a flue connecting one end of the furnace with said regenerator and a valve in said flue, a second regenerator and a duct connecting the same with the other end of the manifold, a valve in said duct between said other end of the manifold and the second regenerator, a flue leading from the other end of the furnace to said second regenerator, and a valve in the last-mentioned flue.

2. In an open hearth furnace, a flue communicating with each end of said furnace, a regenerator in each of said flues, a damper in each of said flues between said regenerator and said furnace, a plurality of burners distributed along the length of the roof of said furnace, an air duct disposed outside the structure of the furnace proper communicating with each of said flues at points between each of said regenerators and said dampers and with each of said burners, and a valve in said air duct between each of said flues and said burners.

KENNETH M. SIMPSON.